Feb. 17, 1925.
J. E. PARKER
1,527,067
GRINDING ARBOR ADAPTER
Filed Aug. 18, 1922  2 Sheets-Sheet 1
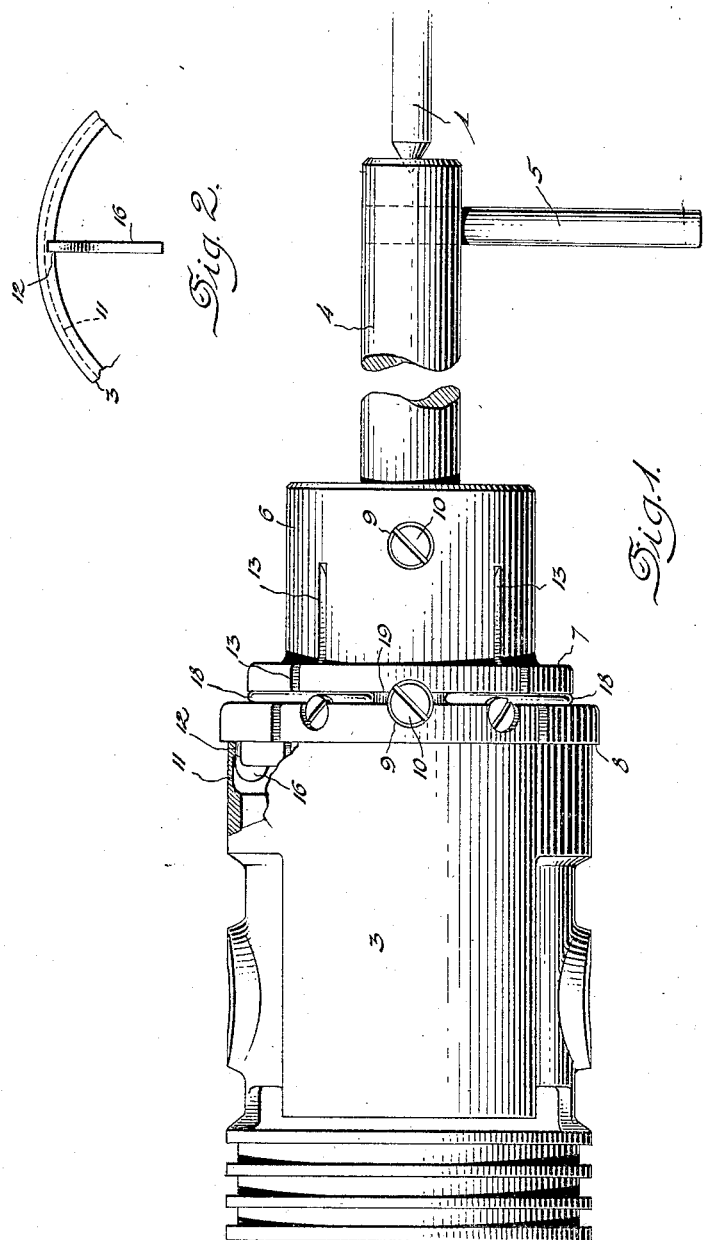
Inventor
John E. Parker.
By
Attorneys Feb. 17, 1925.

J. E. PARKER 1,527,067

GRINDING ARBOR ADAPTER

Filed Aug. 18, 1922   2 Sheets-Sheet 2

Inventor
John E. Parker.
By
Attorneys

Patented Feb. 17, 1925.

1,527,067

UNITED STATES PATENT OFFICE.

JOHN E. PARKER, OF HOWELL, MICHIGAN, ASSIGNOR TO SPENCER-SMITH MACHINE COMPANY, OF HOWELL, MICHIGAN, A CORPORATION OF MICHIGAN.

GRINDING-ARBOR ADAPTER.

Application filed August 18, 1922. Serial No. 582,590.

*To all whom it may concern:*

Be it known that I, JOHN E. PARKER, a citizen of the United States of America, residing at Howell, in the county of Livingston and State of Michigan, have invented certain new and useful Improvements in Grinding-Arbor Adapters, of which the following is a specification, reference being had therein to the accompanying drawings.

This invention relates to means for supporting hollow bodies between centers, and has special reference to a centering device and adapter by which piston bodies and the like may be mounted between the center members, chucks or similar devices of the head and tail stock of a lathe or other machine, whereby such piston bodies may be supported for accurate grinding, trimming, facing or other operations.

One of the objects of my invention is to provide a self centering head which may be inserted in the open end of a piston body or the like to correctly position an arbor or shaft axially of the piston body.

Another object of this invention is to provide a self centering head or mandril that can be easily and quickly mounted in a hollow member to seek a position axially thereof, said self centering head including a plurality of circumferentially disposed pivoted spring pressed members that may be adjusted relative to the head.

A further object of this invention is to provide a grinding arbor and adapter by which piston bodies or hollow members may be expeditiously mounted between the head and tail stocks of a lathe or supports of other machines to permit of the exterior of the piston bodies being operated upon by various kinds of instrumentalities and irrespective of any exterior irregularities the grinding arbor and adapter correctly positions the piston bodies for external operations.

The above are a few of the objects attained by a simple and durable construction to be hereinafter described and claimed, reference will now be had to the drawing, wherein—

Figure 1 is a side elevation of the self centering head in a piston body supported between centering members;

Fig. 2 is a detail view showing how a pivoted member engages in the piston body;

Figure 3:
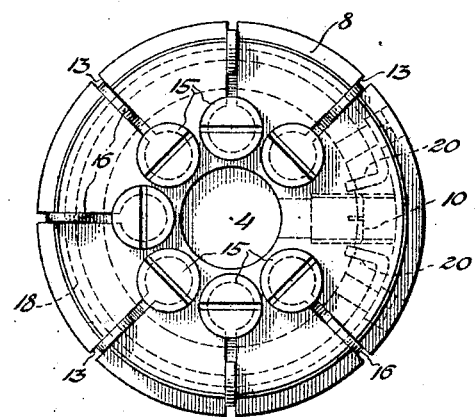
Fig. 3 is an end view of the self centering head.
Figure 4:
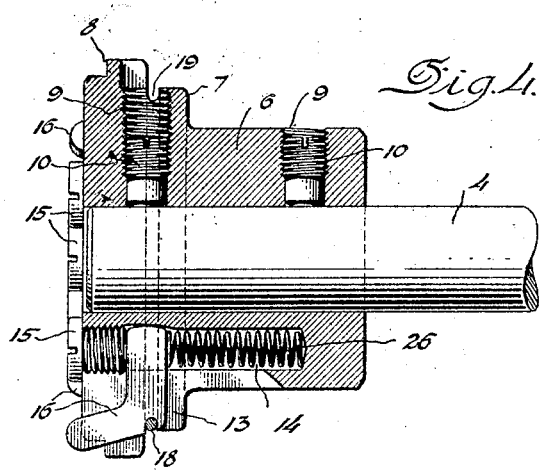
Fig. 4 is a longitudinal sectional view of the same.
Figure 5:
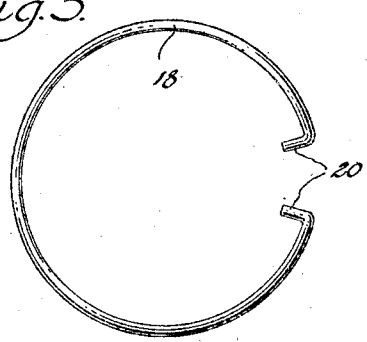
Fig. 5 is an elevation of a detached retaining ring.
Figure 6:
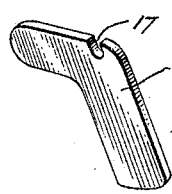
Fig. 6 is a perspective view of a detached centering member.

In the drawings, the reference numerals 1 and 2 denote center members in opposed relation and representing center pieces, chucks, or various types of holding or gripping devices that may form part of head and tail stocks of a lathe or other machine that may be used for external operations on a piston body 3 or other hollow member having a closed end adapted to be supported by one of the center members 1 or 2 and the open end of the piston body supported by the other center member, so that piston body may be revolved and turned down, grooved, faced or otherwise operated upon by an instrumentality held stationary relative to the revolving piston body. In order that the piston body may be properly centered relative to the axis of the center members 1 and 2, it is necessary that some supporting means be interposed between the open end of the piston body and one of the center members with the supporting means establishing a rigid connection with the piston body for driving purposes.

The supporting means herein disclosed comprises an arbor or shaft 4 having a crank pin 5 adjacent one end and in the present instance the outer end of the arbor or shaft 4 is supported by the center member 1 and may be revolved by a driven member engaging the crank or pin 5, as is the usual practice.

On the inner end of the arbor or shaft 4 is a cylindrical head 6 provided with a collar 7 and a peripheral abutment 8. The head 6 and the collar 7 thereof have openings 9 with the walls thereof screwthreaded to receive countersunk screws 10 which engage the arbor or shaft 4 and secure the head 6 on said arbor or shaft. The collar 7 is adapted to extend into the open end of the piston body 3 with the annular abutment 8 bearing against the end of the piston body, as best shown in Fig. 1, and with the collar 7 of less diameter than the inner diameter of the piston body, said collar and the head 6 can be centered within the piston body. In order that this may be accurately accomplished, the inner wall of the piston body, at its open end, is reamed, ground or otherwise operated upon to provide a smooth and uninterrupted annular wall 11 and at any desired point in this wall is a longitudinal slot or groove 12, the purpose of which will hereinafter appear.

The head 6 and the collar 7 are provided with a plurality of radially disposed kerfs or slots 13 each communicating with a longitudinal bore 14 in the head 6 with the outer end of the bore interiorly screw-threaded to receive a regulating screw 15 and the inner end of the bore houses a coiled expansion spring 26.

In the kerfs or slots 13 are placed bell cranks or angular centering members 16 provided with notches 17 to receive a split retaining ring 18, said ring being mounted in an annular groove 19 provided therefor in the collar 7, and the split ends of the retaining ring 18 may be inturned, as at 20 and suitably anchored in the collar 7, as best shown in Fig. 3, to prevent circumferential shifting and displacement of the resilient retaining ring. This retaining ring pivotally supports the centering member 16 relative to the head 6 with the inner ends of said members extending between the regulating screws 15 and the springs 26. The expansive force of the springs 26 holds the inner ends of the centering member 16 against the inner ends of the regulating screws 15 and it is in this connection that these screws serve as adjustable abutments to limit the outward movement of the outer ends of the centering member 16 which outer ends protrude from the slots 13 contiguous to the peripheral abutment 8. The springs 26 permit of the centering members 16 yielding when encountering the annular inner wall 11 of the piston body 3 and one of said centering members is adapted to engage in the slot or groove 12 of the piston body and thus form a snap to establish a driving relation between said piston body and the head 6. Since the centering members 16 may individually yield relative to the true annular wall 11 of the piston body 3, it is obvious that the head 6 will be self centering relative to the wall 11 and by seeking a position therein a true and accurate axis is established between the center members 1 and 2 about which axis the piston body 3 may be revolved so that peripheral operations performed on the piston body will be concentric of such axis.

I attach considerable importance to the fact that when my centering device is used in connection with a lathe that the center members 1 and 2 need not be shifted for pieces of work of various lengths, as it is only necessary to loosen the screws 10 and slide the arbor or shaft 4 in the head 6 in order that the piece of work may be correctly positioned or held between the center members. With these members preferably alining and providing true centers, with no adjustment of said center members, it is obvious that the center points are fixed and can be depended upon when centering a piece of work between the center members.

What I claim is:—

1. A grinding arbor and adapter comprising a shaft, a head slidable on said shaft and adapted to be fixed thereon, and a plurality of pivoted tiltable members carried by said head and adapted to be snapped into engagement with a piece of work.

2. A grinding arbor and adapter as called for in claim 1, wherein said pivoted members for the inner ends thereof spring pressed and capable of being adjusted.

3. A grinding arbor and adapter as called for in claim 1, wherein said pivoted members are disposed circumferentially of said head, and set screws in the end of said head are adapted to limit the tilting of said members in one direction.

4. A grinding arbor and adapter as called for in claim 1, wherein said pivoted members are disposed circumferentially of said head, and a retaining ring holds said members in engagement with said head and serves as a pivot for said members.

5. Means for supporting a piston body between center members, one of which is laterally engaged by the piston body, said means comprising a self centering head, a snap thereon adapted to be snapped into the piston body, and an arbor axially of said head and adapted to be engaged by the other center member.

6. Supporting means for a piston body, as called for in claim 5, wherein said self centering head includes a plurality of spring pressed members, one of which engages the piston body to establish rotative continuity between said head and piston body.

7. Supporting means for a piston body, as called for in claim 5, wherein said self centering head includes a plurality of spring pressed members, and a set screw for each member to regulate the position of the member relative to said head.

8. Means for supporting a piston body between center members, one of which is engaged by the piston body, said means comprising a head adapted to abut the end of the piston body and be supported from the other center member, and yieldable means carried by said head for engagement with the inner wall of the piston body to center said head in said piston body.

9. Supporting means for a piston body, as called for in claim 8 wherein said yieldable means includes pivoted members set in said head, a ring retaining said member therein.

10. Supporting means for a piston body, as called for in claim 8, wherein said yieldable means includes pivoted members, and adjustable abutments for said pivoted members.

11. An adapter comprising a head, bell cranks having angular portions thereof pivotally supported relative to said head, and means disposed parallel to the axis of said head and engaging the inner ends of said bell cranks adapted to retain the outer ends of said bell cranks distended for a snap action in entering a piece of work.

In testimony whereof I affix my signature in presence of two witnesses.

JOHN E. PARKER.

Witnesses:
OTTO F. BARTHEL,
ARTHUR MINNICK.